United States Patent Office 3,025,239
Patented Mar. 13, 1962

3,025,239
PETROLEUM OIL COMPOSITION
David B. Sheldahl, Griffith, Ind., assignor to Sinclair Refining Company, New York, N.Y., a corporation of Maine
No Drawing. Filed Aug. 28, 1957, Ser. No. 680,660
12 Claims. (Cl. 252—33)

This invention relates to new compositions of matter and more particularly to a new class of chemical compounds derived from the reaction of a monocarboxylic acid and fatty diamine with an aromatic sulfonic acid. In other aspects this invention relates to novel compositions of matter and their use as a corrosion inhibitor in mineral oils which normally come in contact with metals.

Various corrosion inhibitors have been suggested for use in mineral oil bases for the protection of metal surfaces, both internal and external, which come in contact with the base oils. Many of these inhibitors when included in distillate fuels, for example, have proved disadvantageous inasmuch as films produced therefrom do not exhibit sufficient resistance to moisture, particularly under high humidity conditions. In many applications, as in diesel engine flushing fuels, for example, the base oil must be inhibited against corrosion under high humidity conditions and at the same time it is desirable, and in fact some specifications required, that the inhibitor be ashless.

In accordance with this invention I have found that corrosion problems occurring from mineral oils contacting metallic surfaces can be materially lessened through use of novel corrosion inhibitors prepared by reacting certain fatty diamines and monocarboxylic acids together with aromatic sulfonic acids. The inhibitor products are identified as monosulfonate fatty diamine salts of monocarboxylic acids and as shown hereinafter, these reaction products have been found to exhibit marked protection of metal surfaces, particularly ferrous surfaces, which are in contact with mineral oil products containing small amounts of moisture. When blended in mineral oil products such as gasoline and diesel fuel, such fuels easily pass humidity cabinet corrosion tests which thus indicates their resistance to moisture under high humidity conditions. The novel inhibitor products of this invention afford protection in static and dynamic systems, as for example in pipe line and storage tanks, and effectively prevent corrosion without influencing basic characteristics of the mineral oil products in which they are incorporated. The inhibitor products are further advantageous in that they will not form a combustion ash upon being subjected to relatively high temperatures.

The corrosion inhibiting compositions of this invention are formed by adding to a suitable mineral oil base a compound or mixture of compounds having the following structures:

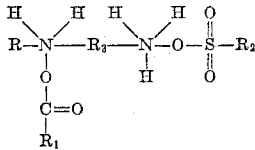

or

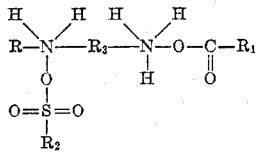

in which R and $R_1$ represent a monovalent hydrocarbon radical containing from about 6 to 22 carbon atoms; $R_2$ is an aromatic hydrocarbon radical or residue derived from aromatic sulfonic acids; and $R_3$ is a divalent aliphatic hydrocarbon radical containing from about 2 to 8 carbon atoms, branched chain or straight chain and substituted or unsubstituted. The groups R and $R_1$ may be alike or different, saturated or unsaturated, straight chain or branched chain, may contain substituent groups such as amino, halogen, hydroxy, nitrile, and the like, and preferably are aliphatic.

The novel corrosion inhibiting compounds of the present invention are mineral oil-compatible, i.e. the compounds are dispersible, soluble or miscible without continuing agitation. The materials are identified as monosulfonate fatty diamine salts of monocarboxylic acids and can be prepared, for example, by reacting an aromatic sulfonic acid and monocarboxylic acid in stoichiometric amounts with the fatty diamine. The reaction is almost instantaneous if carried out at a temperature between about 100 to 160° F. but will occur slowly at room temperature. If desired, the reaction may be effected with the aid of a solvent or at higher temperatures below the decomposition point of the reactants or product. Advantageously, as shown hereinafter, more than the stoichiometric amounts of the reactants can be employed; for example, up to twice as much or more of the reactants can be present and the excess resulting from the reaction may be included with the principal corrosion inhibiting salt when added to a mineral oil base.

The fatty diamine portion of the novel corrosion inhibitor compound has the structural formula:

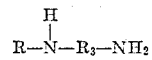

in which R is an aliphatic hydrocarbon chain of at least about 6 and preferably about 12 to 22 carbon atoms, and $R_3$ is as above described. Preferably $R_3$ is a polymethylene group of about 2 to 8 carbon atoms and advantageously about 2 to 4 carbon atoms. These diamines can be prepared by a variety of well-known procedures, as for example, by reacting an aliphatic chloride containing the desired number of carbon atoms with a polymethylene diamine which contains from 2 to 8 methylene groups. The aliphatic R group which is attached to the nitrogen atom is either saturated or unsaturated and is preferably an alkyl or alkylene residue radical obtained from fatty acids. Fatty acids which are suitable for providing residues containing the desired number of carbon atoms can be obtained from fats and oils such as soybean oil, lard oil, castor oil, corn oil, tallow, coconut oil, etc. or from resin acids such as those derived from tall oil which contains a mixture of fatty acids and resin acids.

An example of a preferred fatty diamine used in the preparation of the corrosion inhibitor of this invention is a diamine designated as "Duomeen T" in which $R_3$ in the above formula is trimethylene and R is the straight chain hydrocarbon residue derived from tallow fatty acids containing 16 to 18 carbon atoms, both saturated and unsaturated. Similar fatty diamines can be used in which the hydrocarbon group is derived from monobasic acids such as, for example, lauric acid, myristic acid, palmitic acid, stearic acid, margaric acid, oleic acid, ricinoleic acid, linoleic acid, etc., as well as monobasic acids derived by oxidation of petroleum waxes. As abovementioned, although preferred fatty diamines are those characterized by having the amino groups attached to carbon atoms which are separated by a third carbon atom, it is also within the scope of this invention to employ fatty diamine compounds which have the amino groups attached to carbon atoms which are separated by up to 6 carbon atoms such as, for example, dimethylenediamine, tetramethylenediamine, 1,5-diaminopentane, triethylenediamine, and the like. Other commercially available diamines useful in this invention are fatty diamine salts of fatty acids such as "Duomeen T monooleate" and "Duomeen T dioleate," products of Armour & Co., which have the formulae:

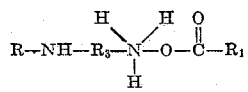

or

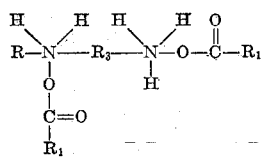

in which R and $R_3$ are the same as described above for "Duomeen T," and $R_1$ is the unsaturated straight chain radical present in oleic acid. Other monocarboxylic acids which may be used to provide the hydrocarbon radical $R_1$ may be straight chain or branched chain, substituted or unsubstituted, saturated or unsaturated, and include such acids as capric acid, caproic acid, undecylic acid, lauric acid, myristic acid, ricinoleic, oleic acid, linoleic, stearic acid, palmitic acid, margaric acid, arachidic acid, mixtures of any two or more of these acids or others, fatty acids derived from animal or vegetable sources, hydroxy and alpha-hydroxy fatty acids such as hydroxy stearic acid, dihydroxy stearic acid, alpha-hydroxy stearic acid, alpha-hydroxy lauric acid, and fatty acids derived from various waxes such as beeswax, spermaceti, and the like. Similarly, we may use monocarboxylic acids derived by oxidation of petroleum waxes, such as slack wax, crude foots oil, microcrystalline wax, etc., as well as naphthenic acid and abietic acid. Although reaction products formed from the various above carboxylic acids are effective corrosion inhibitors, the preferred monocarboxylic acids used in accordance with this invention are those in which the hydrocarbon radical contains from about 12 to 18 carbon atoms, saturated or unsaturated, such as stearic acid, linoleic acid and palmitic acid, with particular preference being directed to oleic acid and the monocarboxylic acids obtained from oxidized petroleum waxes.

Among the petroleum waxes which can be oxidized to provide useful monocarboxylic acids are waxy materials such as slop waxes, petrolatum stock, slack wax, scale waxes, paraffin waxes, needle waxes, microcrystalline waxes and the like. These waxes are non-aromatic hydrocarbons and may be recovered from suitable petroleum fractions such as Pennsylvania crudes, East Texas crudes, Mid-Continent crudes and the like by deasphalting the desired hydrocarbon and thereafter removing the wax from the asphalt-free hydrocarbon fraction by any known suitable means. The waxes can be recovered, for example, by selective solvent treatment using liquefied propane, butane, or other oxygen-containing liquid organic substances such as alcohols and ethers. In this invention preferred fatty acids containing from about 14 to 20 carbon atoms, and preferably about 16 carbon atoms, are obtained by oxidizing crude foots oil or slop wax with oxygen and potassium permanganate at a temperature of about 220 to 310° F. These crude foots oil wax oxidates are described in U.S. Patent No. 2,776,309 to John W. Nelson and can be obtained by treating a waxy portion derived from a Pennsylvania steam cylinder stock with methyl ethyl ketone. Similar fatty acid materials which are useful can be obtained by the distillation of microcrystalline wax oxidate as described in U.S. Patent 2,610,974 to John W. Nelson.

The sulfonic acid materials which can be used in the preparation of the corrosion inhibitors of this invention are the aromatic sulfonic acids including those derived from petroleum products such as lubricating oil distillates and gas oils. The useful petroleum sulfonic acids thus include the water-soluble or water-dispersible green acids and the preferentially oil-soluble acids referred to as mahogany acids. The green acids are found in the acid sludge resulting from the treatment of a suitable petroleum oil such as a liquid petroleum distillate boiling in the range of 600 to 1000° F. with fuming sulfuric acid or sulfur trioxide, and are in fact mixtures of water-soluble sulfonic acids known as black acids, intermediate detergent-type sulfonic acids, and oil-soluble sulfonic acids called brown acids. The green acids are hydrophilic in character and can be recovered from the acid sludge by adding water to the sludge to dilute the sulfuric acid therein to a concentration of about 20 to 30 percent, at which concentration the green acids separate to form the supernatant layer, or they can be extracted from the sludge by using water-soluble solvents. The mahogany acids, some of which show limited hydrophilic properties, are oil-soluble or hydrophobic by nature and can be recovered from the acid treated oil or obtained as a concentrate in the acid oil varying from 10 to 50 percent by weight. The useful mahogany acids generally have a molecular weight of from about 300 to 500, or more, and although their exact chemical structures may vary, it appears that such acids are composed to a large extent of sulfonated aromatic hydrocarbons having either one or two aromatic rings per molecule possibly with one or more long-chain alkyl groups containing from about 8 to 30 carbon atoms attached to the ring nuclei.

Suitable sulfonic acids which include both the oil and water-soluble petroleum sulfonic acids are the aryl sulfonic acids, benzene sulfonic acids, cymene sulfonic acid, naphthalene sulfonic acid, alkylated naphthalene sulfonic acid, fatty sulfonic and fatty aromatic sulfonic acids. Other useful aromatic sulfonic acids are the oil-soluble ammonia neutralized sulfonated mixtures of polyalkylated benzenes; alkyl aryl sulfonic acids in which the alkyl chain contains from about 8 to 18 carbon atoms; synthetic sulfonic acids prepared by reaction of paraffin wax chains of 20 or more carbons with aromatic nuclei which are then sulfonated by fuming sulfuric acid, e.g. wax substituted naphthalene; ammonium mahogany sulfonic acids obtained by reaction of ammonia with sulfuric acid treated hydrocarbon oil, ammonium sulfonates of the alkyl aryl sulfonic acids, particularly those having a monocyclic nucleus, all of which are available or may be readily prepared by known methods.

A particularly useful sulfonic material is "Bryton ammonium sulfonate." This product is prepared by the sulfonation and subsequent neutralization with ammonia of the bottoms produced in the manufacture of monododecylbenzene; i.e., the bottoms remaining after fractionation to remove the monododecylbenzene from the reaction products of dodecene with benzene, which bottoms consist essentially of di-dodecylbenzene along with other polyalkylated benzene molecules. This material is described in U.S. Patent No. 2,739,050 to T. G. Wisherd.

The inhibitor salts of this invention can be derived by various reactions and from a number of different starting materials. Most advantageously, the new products are prepared by reacting the appropriate fatty diamine monocarboxylic acid salt, e.g. fatty diamine monooleate, with an aromatic sulfonic acid or a corresponding sulfonate. The reaction temperature is conveniently within the range from about 100 to 160° F., and preferably from about 120 to 140° F. The corrosion inhibitors are derived by reaction of one molecule of the fatty diamine monocarboxylic acid salt with a molecule of the sulfonic acid or sulfonate; however, more than the stoichiometric amount, for instance, up to two times as much or more of fatty diamine monocarboxylate or neutralized sulfonate can be present during the reaction and the excess included with the principal corrosion inhibiting salt when added to the mineral oil base.

The desired monosulfonate fatty diamine salts of monocarboxylic acids can be derived from other reactants under essentially the same conditions as noted above. A fatty diamine di-fatty acid salt, such as a fatty diamine di-oleate, can be reacted with the sulfonic acid or sulfonate to provide the corrosion inhibitors of this invention in admixture with free fatty acid. Also, the fatty diamine fatty acid salt or the similar di-fatty acid salt could be sulfonated by reaction at the above-mentioned temperatures with fatty diamine monosulfonate or fatty diamine disulfonate and as in the other methods described above, any of the reactants can be present in more than the stoichiometric amount and the excess portion may be included with the inhibitor in the base mineral oil. Apparently these various methods can be employed due to an affinity for rearrangement or exchange of the carboxyl and sulfonic acid radicals so that one of each of these radicals is disposed on separate nitrogen atoms of the fatty diamine molecule. From an economical standpoint, it is advantageous that only one monocarboxylic acid radical and sulfonic acid radical be supplied to the reaction in combination with a fatty diamine. Thus, it is preferred to combine reactants such as fatty diamine monocarboxylate with the sulfonic acid or sulfonate.

In a preferred embodiment of this invention a stoichiometrical amount of "Duomeen T monooleate" is reacted with mahogany sulfonic acid or ammonium mahogany sulfonate, preferably as a 10 percent concentrate in the oil from which they are derived. During the reaction the sulfonate radical attaches to the fatty diamine monooleate thus effecting the formation of a fatty diamine monooleate-monosulfonate. Likewise, if the fatty acid diamine di-oleate, "Duomeen T di-oleate," be substituted for the monooleate, a clear homogeneous solution of the monosulfonate fatty diamine monooleate mixed with oleic acid results which is a very effective corrosion inhibitor. When more than the stoichiometric amount of fatty diamine monooleate is used, the product contains the fatty diamine monooleate-monosulfonate together with excess fatty diamine monooleate and is a very effective inhibitor. If ammonium sulfonate is employed in any of the reactions of the invention it may be necessary to blow the product with air to remove ammonia and avoid a slight precipitate in the product.

The corrosion inhibitors of this invention are effective in liquid petroleum hydrocarbons such as lubricating oils and light distillates, i.e. liquid hydrocarbons boiling up to and including gas oils. As examples they can be employed in gasoline, kerosene, petroleum solvents, diesel fuels, heating oils, neutral oils, etc. The amount employed in a given instance will depend upon the character of the base oil and the degree of corrosion inhibition desired with a small but sufficient amount being employed to given substantial corrosion inhibition. Generally, the inhibitor will comprise from about 0.001 to 5.0 weight percent or more of the total composition with larger amounts being used as the specific gravity or viscosity of the base oil increases. As examples, with gasoline the amount of inhibitor will vary generally from about 0.001 to 2 weight percent of the total composition including the base oil with about 0.5 to 2 percent being useful for humidity cabinet protection. On the same basis about 0.001 to 3 weight percent of inhibitor would normally be used in diesel fuel compositions whereas 0.75 to 3 percent would be used for flushing compositions. The corrosion inhibitors of the present invention may be used alone or in combination with other additives such as anti-foam agents, detergent additives, pour depressants, viscosity index improvers, etc. Since the mineral oil is present in relatively large amounts, the optimum concentration of any combination of inhibitors employed will, of course, depend upon the particular type of mineral oil base stock and the potency of the additive combination contained therein.

The following specific examples will serve to illustrate the present invention but they are not to be considered limiting.

EXAMPLE I 15.5 parts by weight of "Duomeen T monooleate" and 84.5 parts by weight of mahogany sulfonic acid as a 10 percent solution in its base petroleum oil (300 SUS at 100° F., acid number of 16.4) were reacted at 120 to 140° F. A clear homogeneous solution resulted which was a 24 percent concentrate of fatty diamine monooleate-monosulfonate and the solution had the following properties.

| | |
|---|---:|
| Gravity, API | 23.7 |
| Viscosity SUS, at 100° F | 450.1 |
| Flash, ° F | 350 |
| Fire, ° F | 410 |
| Acid number | 26.5 |
| Saponification number | 26.4 |
| Nitrogen, percent | 0.69 |
| Sulfur, percent | 0.81 |
| ASTM ash, percent | 0.000 |

EXAMPLE II 19 parts by weight of "Duomeen T di-oleate" and 81 parts by weight of ammonia neutralized sulfonic acid oil of Example I (containing 10 percent ammonium mahogany sulfonate and having an acid number of 13.3) were reacted at 120 to 140° F. Air was blown through the reaction mixture to remove ammonia and a solution resulted which contained a 27 percent concentrate of fatty diamine monooleate-monosulfonate.

EXAMPLE III 37.6 parts by weight of "Duomeen T monooleate" and 62.4 parts by weight of "Bryton ammonium sulfonate" (containing 35 percent ammonium alkyl-aryl sulfonates and having an acid number of 47.75) were reacted at 120 to 140° F. Air was blown through the reaction mixture to remove ammonia and a solution resulted which contained 59 percent fatty diamine monooleate-monosulfonate.

EXAMPLE IV 19 parts by weight of "Duomeen T di-oleate" and 81 parts by weight of the 10 percent sulfonic acid solution of Example I were reacted at 120 to 140° F. A clear homogeneous solution resulted which contained a 27 percent concentrate of fatty diamine monooleate-monosulfonate.

EXAMPLE V

Fatty acids were obtained by oxidizing foots oil in the following manner: 12,000 grams of foots oil (API gravity of 40.8, an actual pour point of 112° F., a saponification number of 0, acid number 0.10, iodine No. 1.3) containing 7.50 weight percent oil and 0.03 percent sulfur were added to a flask containing 101 grams of potassium permanganate dissolved in 500 grams of water at a temperature of about 185° F. 100 grams of oxidized foots oil were added with agitation at 200° F. to act as a "seed." A small stream of oxygen was passed through the agitated mixture while heating to 310° F., after which a normal oxygen rate of 2.65 cubic feet per hour was employed. The mass was cooled to 250° F. and oxidation was continued for about 16 hours at a temperature of about 240 to 260° F. and then at a temperature of 220° F. for about seven hours. 3,964 grams of the product were removed from the flask and the remainder of the product was further oxidized for seven hours at 220° F. and then filtered through a Buchner funnel at a temperature of 180° F. The product weighed 7,553 grams and did not darken upon boiling with hot concentrated excess caustic. The solid product yield, based on foots oil, and including samples and unfiltered portion removed after about 23 hours' oxidation, was 97 percent (97 pounds per 100 pounds of foots oil charged). The foots oil oxidate was characterized by a melting point of about 80 to 95° F., an API gravity of about 10–25, a saponification number of about 200–325 and an acid number of about 150 to 200. Upon purification the acid number was lowered to about 100–150 and the saponification number to about 200–250.

EXAMPLE VI

Nine parts by weight of "Duomeen T," 11 parts by weight of fatty acids derived from the oxidation of foots oil essentially as described in Example V and 80 parts by weight of mahogany sulfonic acids as a 10 percent solution in its base petroleum oil (300 SUS at 100° F.; acid number of 16.4) were reacted at a temperature of 120 to 140° F. A clear homogeneous solution resulted which was a 28 percent concentrate of the monosulfonate fatty diamine salts of the monocarboxylic acids. The solution had the following properties.

Gravity, API _____ 22.4
Viscosity SUS:
   At 100° F _____ 707
   At 210° F _____ 71.4
Flash, ° F _____ 365
Fire, ° F _____ 430
Pour, ° F _____ 40
Color, NPA _____ 8–
Acid number _____ 25.6
Saponification number _____ 35.7
Nitrogen, percent _____ 0.77
Sulfur, percent _____ 0.77

In order to show the outstanding corrosion characteristics of the compounds of this invention, the novel inhibitor as prepared in the foregoing examples were blended with diesel fuel and subjected to a humidity cabinet corrosion test identified as the MIL–L–21260 type specification (Lubricating Oil, Internal Combustion Engine, Preservative). This test is carried out as follows:

Small sand blasted mild steel panels are dipped in the petroleum hydrocarbon and after draining two hours at room temperature are suspended in a highly humid atmosphere, generally about 100 percent humidity, at 120° F. in a special cabinet. The time of initial corrosion of the panels is noted. The humidity cabinet is provided with heating units and thermal regulators for automatic temperature control. A water level of 8 inches is maintained in the bottom of the cabinet and 8 linear feet per hour of clean air is bubbled through the water to assure high humidity at all times. The steel panels are suspended by stainless steel hooks around the periphery of the humidity cabinet. About three complete changes of air per hour are provided in the cabinet. In order to pass the test, no more than 3 rust spots 1 mm. in diameter should be observed on the panel after six days exposure in the cabinet.

A summary of the humidity cabinet results obtained from using the monosulfonate fatty diamine salts of monocarboxylic acids as corrosion inhibitor in diesel fuel is shown below. The diesel fuel employed had an API gravity of 38.6, a boiling range of 370 to 640° F. and an SUS viscosity of 35.6 at 100° F. The effectiveness of the novel corrosion inhibitor is revealed by the number of days the test panel is exposed before failure occurred. As compared to the aromatic sulfonic acids, the sulfonates, or the diamine oleates, striking differences in results were obtained. The inhibitor solutions employed do not contain 100 percent active ingredients. The fatty diamine oleates are about 100 percent active and the mahogany sulfonic acids, ammonium mahogany sulfonate and fatty diamine sulfonates are approximately 10 percent active. "Bryton ammonium sulfonate" is about 35 percent active. The balance of the inhibitor solution is petroleum hydrocarbons.

Table 1
MIL–L–21260 HUMIDITY CABINET TEST RESULTS

| Corrosion inhibitor concentration (weight percent) | | | | | Prepared as in Example | Average number of days before rusting |
|---|---|---|---|---|---|---|
| Ammonium mahogany sulfonate on a dry soap basis | "Bryton Ammonium Sulfonate" on a dry soap basis | "Duomeen T Mono-oleate" | "Duomeen T Di-oleate" | Fatty diamine monocarboxylate monosulfonate on a dry soap basis | | |
| 1.0 | | | | | | 3 |
| 0.5 | | | | | | 2.5 |
| | 0.91 | | | | | 2 |
| | 0.46 | | | | | 1 |
| | | 1 | | | | 2 |
| | | | 1 | | | 4 |
| | | | | 0.96 | (I) | 16 |
| | | | | 0.72 | (I) | 6 |
| | | | | 1.08 | (II) | 13.5 |
| | | | | 0.81 | (II) | 7 |
| | | | | 1.08 | (IV) | 11 |
| | | | | 0.54 | (IV) | 4 |
| | | | | 1.18 | (III) | 10.5 |
| | | | | 0.87 | (III) | 4.5 |
| | | | | 1.12 | (VI) | 4.5 |
| | | | | .56 | (VI) | 1.0 |
| None | None | None | None | None | | 0 |

The following examples illustrate preparation of the corrosion inhibitors by using an excess of the fatty diamine monocarboxylate reactant.

EXAMPLE VII 25 parts by weight of "Duomeen T monooleate" and 75 parts by weight of ammonia neutralized sulfonic acid oil (containing 10 percent ammonium mahogany sulfonate) were reacted at 120 to 140° F. Air was blown through the reaction mixture to remove ammonia and a solution resulted which contained a 32.5 percent concentrate of fatty diamine monooleate-monosulfonate containing fatty diamine monooleate.

EXAMPLE VIII 25 parts by weight of "Duomeen T monooleate" and 75 parts by weight of mahogany sulfonic acid as a 10 percent solution in its base petroleum oil were reacted at 120 to 140° F. A solution resulted which contained a 32.5 percent concentrate of fatty diamine monooleate-monosulfonate containing fatty diamine monooleate.

EXAMPLE IX 55 parts by weight of "Duomeen T monooleate" and 45 parts by weight of "Bryton ammonium sulfonate" (containing 35 percent ammonium alkyl-aryl sulfonates) were reacted at 120 to 140° F. Air was blown through the reaction mixture to remove ammonia and a solution resulted which contained a 70.7 percent concentrate of fatty diamine monooleate-monosulfonate containing fatty diamine monooleate.

The data of Table II show the effectiveness of the fatty diamine monooleate-monosulfonate inhibitor containing excess fatty diamine monooleate as compared to the effect of the aromatic sulfonates or the diamine monooleate on humidity cabinet lives of test panels. The diesel fuel and test employed were the same as in Table I.

Table II

MIL-L-21260 HUMIDITY CABINET TEST RESULTS

| Corrosion inhibitor | As prepared in example | Concentration, weight percent (dry soap basis) | Average number of days before rusting |
|---|---|---|---|
| 1. Ammonium mahogany sulfonate | | 1.0 | 3 |
| 2. Bryton ammonium sulfonate | | .91 | 2 |
| 3. Duomeen T monooleate | | 1.0 | 2 |
| 4. Duomeen T monooleate-monosulfonate containing fatty diamine monooleate. | VII | 1.3 | 18 |
| 5. Duomeen T monooleate-monosulfonate containing fatty diamine monooleate. | VIII | 1.3 | 17 |
| 6. Duomeen T monooleate-monosulfonate containing fatty diamine monooleate. | VIII | .97 | 13 |
| 7. Duomeen T monooleate-monosulfonate containing fatty diamine monooleate. | IX | 1.67 | 21 |
| 8. Duomeen T monooleate-monosulfonate containing fatty diamine monooleate. | IX | 1.08 | 6.2 |
| 9. None | | None | 0 |

The following examples illustrate the method of preparing the novel inhibitors by the reaction of "Duomeen T monooleate" and "Duomeen T disulfonate," the latter material being substituted for the mahogany sulfonic acids or ammonium mahogany sulfonates. In Examples XI and XII an excess of fatty diamine monocarboxylate reactant is employed.

EXAMPLE X 16.6 parts by weight of "Duomeen T monooleate" and 83.4 parts by weight of "Duomeen T disulfonate" (fatty diamine mahogany sulfonate as a 10 percent solution in its base petroleum oil) were reacted at 120 to 140° F. A clear homogeneous solution resulted which was a 24.9 percent concentrate of fatty diamine monooleate-monosulfonate.

EXAMPLE XI 25 parts by weight of "Duomeen T monooleate" and 75 parts by weight of "Duomeen T disulfonate" (fatty diamine mahogany sulfonate as a 10 percent solution in its base petroleum oil) were reacted at 120 to 140° F. A clear homogeneous solution resulted which was a 32.5 percent concentrate of fatty diamine monooleate-monosulfonate containing fatty diamine monooleate.

EXAMPLE XII 20 parts by weight of "Duomeen T monooleate" and 80 parts by weight of "Duomeen T disulfonate" (fatty diamine mahogany sulfonate as a 10 percent solution in its base petroleum oil) were reacted at 120 to 140° F. A clear homogeneous solution resulted which was a 28 percent concentrate of fatty diamine monooleate-monosulfonate containing fatty diamine monooleate.

The following data in Table III show the effectiveness of fatty diamine monooleate-monosulfonate as a corrosion inhibitor when using a fatty diamine disulfonate as the sulfonate reactant. The humidity cabinet test and diesel fuel are the same as in Table I. Although the fatty diamine disulfonate shows good inhibition properties when used alone in diesel fuel in concentrations of 1 and 1.5 percent, these amounts of disulfonate deleteriously affect the specification characteristics of base oils, particularly the light oils, when added as a 10 or 15 percent solution in a petroleum oil which would be the form in which it is available on a commercial basis.

Table III

MIL-L-21260 HUMIDITY CABINET TEST RESULTS

| Corrosion inhibitor | As prepared in example | Concentration, weight percent (dry soap basis) | Average number of days before rusting |
|---|---|---|---|
| 1. Duomeen T disulfonate | | 0.5 | 4 |
| 2. Duomeen T disulfonate | | 0.3 | 1 |
| 3. Duomeen T monooleate | | 1.0 | 2 |
| 4. Duomeen T monooleate-monosulfonate. | X | 1.5 | 21 |
| 5. Duomeen T monooleate-monosulfonate containing fatty diamine monooleate. | XI | 1.3 | 18 |
| 6. Duomeen T monooleate-monosulfonate containing fatty diamine monooleate. | XII | 1.05 | 14 |
| 7. None | | None | 0 |

The following table illustrates that the fatty diamine monooleate - monosulfonate - fatty diamine monooleate combination of Example VII is much more effective in petroleum hydrocarbons of low distillation ranges and high volatility (gasoline) than those of higher distillation ranges (kerosene, diesel fuel and 100 SUS at 100° F. lubricating oil). At the same inhibitor concentration longer humidity cabinet lives of test panels result when the test hydrocarbon is gasoline than when any of the other hydrocarbons are used. Quite likely there are a number of factors that cause the inhibitor to be more effective in gasoline, for example, the volatility, viscosity and emulsification properties of the test media which will influence the thickness and nature of the corrosion inhibitor film deposited on the test panel during the drainage period prior to the test. When gasoline is the test medium its volatility will play the major role whereas when either kerosene, diesel fuel, or 100 pale oil is the test media, volatility effects are negligible and viscosity governs. Apparently the differences in volatility and viscosity of the test media leaves a film on the test panel that produces a water-in-oil emulsion of more stability when gasoline is used for the carrier than when non-volatile higher viscosity carriers are used. Because gasoline is very volatile little else but the inhibitor film is left on the test panel after the drainage period; however, when non-volatile test media are used, the inhibitor and carrier are present on the panel in nearly the same proportion as in the original blend. Possibly, because of the high volatility of gasoline, enough of it vaporizes before it can drain from the panel and a thicker inhibitor film remains than when non-volatile oils are used.

Table IV

MIL-L-21260 HUMIDITY CABINET TEST RESULTS

| Corrosion inhibitor | As prepared in example | Inhibitor concentration (dry soap basis), percent | Average number of days before rusting | | | |
|---|---|---|---|---|---|---|
| | | | Gasoline [1] | Kerosene [2] | Diesel fuel [3] | Lubricating oil (100 SUS at 100° F.) |
| 1. Duomeen T Monooleate-monosulfonate-fatty diamine monooleate. | VII | 1.3 | 32 | 20 | 18 | 14 |
| 2. Duomeen T Monooleate-monosulfonate-fatty diamine monooleate. | VII | .65 | 15.5 | 1 | 4 | 3 |

[1] The gasoline used has an API gravity of 61.8, a boiling range of 98–411° F., and a Reid Vapor pressure of 8.55.
[2] The kerosene has a boiling range of 356–492° F., and an API Gravity of 47.1.
[3] See Table I.

The following data of Table V illustrate the results obtained when the compounds prepared in accordance with the present invention were tested in mineral oil products such as gasoline and diesel fuel for dynamic corrosion inhibition properties. The dynamic corrosion test is a modification of ASTM test D-665-47T for rust-preventing characteristics of steam turbine oil in the presence of water. In this modified procedure, a freshly ground rust test coupon consisting of ½-inch diameter by 5½ inches long mild steel rod is suspended in a 400 ml. beaker equipped with a stirrer and placed in a temperature controlled bath capable of maintaining the temperature at 100± 1° F. The test fuel (350 ml.) is added and stirred for thirty minutes to allow the rust inhibitor to precoat the test specimen. Part (50 ml.) of the test fuel is then removed and 30 cc. of distilled water is added. The mixture is stirred for a four-hour test period. At the end of this period, the coupon is removed, dried with suitable solvents, inspected and rated according to the following scale:

| | |
|---|---|
| A | No rust. |
| B++ | Trace rust (covering a maximum of 0.25 percent of total surface area). |
| B+ | 0.25 to 5 percent of surface area covered by rust. |
| B | 5 to 25 percent of surface area covered by rust. |
| C | 25 to 50 percent of surface area covered by rust. |
| D | 50 to 75 percent of surface area covered by rust. |
| E | 75 to 100 percent of surface area covered by rust. |

*Table V*

| Inhibitor | Dynamic test [1] | |
|---|---|---|
| | Gasoline [2] | Diesel fuel [3] |
| Fatty diamine carboxylate salt of oleic acid | 45 | 12 |
| Fatty diamine sulfonate salt of petroleum sulfonic acids | 5.6 | 4.9 |
| Fatty diamine monosulfonate monooleate of Example I | 5.75 | 4.5 |
| Fatty diamine carboxylate salt of fatty acids obtained by oxidation of petroleum waxes | 4.0 | 2.5 |
| Fatty diamine monosulfonate monocarboxylate of Example VI | 4.2 | 3.4 |

[1] Pound of inhibitor needed per 1,000 barrels of hydrocarbon to obtain a B++ or better rating on the modified ASTM D-665 turbine rusting test.
[2] API gravity of 62.6; Reid vapor pressure 9.0; boiling range of 96 to 405° F.; ASTM gum of 2.7.
[3] API gravity of 38.6; a boiling range of 370 to 640° F.; and SUS viscosity of 35.6 at 100° F.

The reaction products of Examples I and VI were added to diesel fuel and evaluated in accordance with the following static test procedure. A flat strip of mild carbon steel (⅛" x ½" x 5⅞") is cleaned with naphtha or other solvent to remove grease and oil and then polished with emery cloth until no rust or pits remain. During these polishing operations and subsequently, the strip should be handled with a clean lintless cloth or a piece of facial tissue. After the strip has been thus prepared, it should be carefully wiped free of emery dust. The specimen together with 100 ml. of the sample to be tested are placed in a corked four ounce oil sample bottle which is allowed to lay on its side at room temperature for one hour. The liquid should cover the test specimen during this contact period. Then add 10 ml. of distilled water, cork tightly, and shake vigorously for three minutes to insure water wetting over the entire strip surface. The specimen should be tightly wedged between the cork and the bottom of the bottle to minimize breakage. The bottle is then restored to an upright position and allowed to stand at room temperature. The specimen is examined for rust daily and after each day the bottle is shaken again to replace water droplets on the specimen in the hydrocarbon phase that may have been disturbed during inspection. When 25 percent of the specimen exposed in the aqueous phase becomes rusted the test has failed. The tests are run in quadruplicate and the average failure time is reported.

*Table VI*

| Inhibitor | Static tests | |
|---|---|---|
| | Concentration, [1] dry soap basis | Failure time hours, diesel fuel [2] |
| Fatty diamine carboxylate salt of oleic acid | 4.5 | 60 |
| Fatty diamine sulfonate salt of petroleum sulfonic acids | 4.5 | 20 |
| Fatty diamine monosulfonate monooleate of Example I | 4.5 | 186 |
| Fatty diamine carboxylate salt of fatty acids obtained by oxidation of petroleum waxes | 3.4 | 72 |
| Fatty diamine sulfonate salt of petroleum sulfonic acids | 3.4 | 16 |
| Fatty diamine monosulfonate monocarboxylate of Example VI | 3.4 | 616 |

[1] Pounds per 1,000 barrels of hydrocarbon.
[2] API gravity of 38.6; a boiling range of 370 to 640° F.; and SUS viscosity of 35.6 at 100° F. Hours before 25% of the area of the coupon exposed to the aqueous phase has rusted.

As shown by Table VI above, the inhibitor compound of Examples I and VI gave excellent corrosion protection as indicated by a number of 186 and 616 hours, respectively, before 25 percent of the test coupon had rusted. As compared to the fatty diamine carboxylates or the fatty diamine sulfonate striking differences in results were obtained even when a smaller amount of inhibitor was employed.

This application is a continuation-in-part of application Serial No. 533,520, filed September 9, 1955, and now abandoned.

I claim:
1. A liquid petroleum oil containing a minor corrosion-inhibiting amount of a compound selected from the formulae consisting of

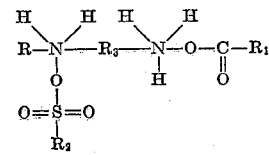

and

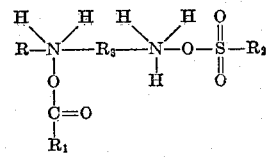

in which R and $R_1$ represent monovalent hydrocarbon radicals containing from about 6 to 22 carbon atoms; $R_2$ is the hydrocarbon radical of an aromatic sulfonic acid, and $R_3$ is a divalent aliphatic hydrocarbon radical containing from about 2 to 8 carbon atoms.

2. The petroleum oil composition of claim 1 wherein the liquid petroleum oil is light distillate.

3. The petroleum oil composition of claim 1 wherein the liquid petroleum oil is selected from the group consisting of gasoline and diesel fuel.

4. The petroleum oil composition of claim 1 wherein the liquid petroleum oil is diesel fuel.

5. The petroleum oil composition of claim 1 in which the liquid petroleum oil is gasoline and the selected compound is about 0.001 to 2 percent by weight of the composition.

6. The petroleum oil composition of claim 1 in which the liquid petroleum oil is kerosene and the selected compound is about 0.001 to 5.0 percent by weight of the composition.

7. The petroleum oil composition of claim 1 in which R is an aliphatic hydrocarbon radical of 12–18 carbon atoms.

8. The petroleum oil composition of claim 1 in which the liquid petroleum oil is diesel fuel and the selected compound is about 0.001 to 3 percent by weight of the composition.

9. The petroleum oil composition of claim 1 in which R is an aliphatic hydrocarbon radical containing from about 12 to 22 carbon atoms; $R_1$ is an aliphatic hydrocarbon radical containing from about 12 to 18 carbon atoms; $R_3$ is a polymethylene group containing from about 2 to 4 carbon atoms and $R_2$ is an aromatic hydrocarbon radical derived from a member selected from the group consisting of mahogany sulfonic acids and didodecylbenzene.

10. The petroleum oil composition of claim 8 containing 0.75 to 3 percent by weight of the selected compound.

11. The petroleum oil composition of claim 9 in which R is an aliphatic fatty acid hydrocarbon radical derived from tallow fatty acids containing 16 to 18 carbon atoms, $R_3$ is trimethylene, and $R_1$ is the aliphatic hydrocarbon radical derived from a member selected from the group consisting of oleic acid and crude foots oil wax oxidate, said oxidate being characterized by a melting point of about 80 to 95° F., an API gravity of about 10 to 25; a saponification number of about 200 to 325 and an acid number of about 150 to 200.

12. The petroleum oil composition of claim 10 in which $R_1$ is the hydrocarbon radical of oleic acid.

References Cited in the file of this patent
UNITED STATES PATENTS

| | | |
|---|---|---|
| 2,270,681 | De Groote | Jan. 20, 1942 |
| 2,321,496 | Liberthson | June 8, 1943 |
| 2,329,406 | Mauersberger | Sept. 14, 1943 |
| 2,391,830 | Jayne et al. | Dec. 25, 1945 |
| 2,467,118 | Duncan et al. | Apr. 12, 1949 |
| 2,533,303 | Watkins | Dec. 12, 1950 |
| 2,582,733 | Zimmer et al. | Jan. 15, 1952 |
| 2,632,694 | Watkins | Mar. 24, 1953 |
| 2,721,843 | Palmer | Oct. 25, 1955 |
| 2,736,658 | Pfohl et al. | Feb. 28, 1956 |
| 2,798,045 | Buck et al. | July 2, 1957 |
| 2,840,584 | Jones | June 24, 1958 |
| 2,845,393 | Varvel | July 29, 1958 |
| 2,882,227 | Lindberg | Apr. 14, 1959 |